United States Patent
Takemori

(10) Patent No.: US 9,915,343 B2
(45) Date of Patent: Mar. 13, 2018

(54) PULLEY PRESSURE CONTROL APPARATUS FOR BELT-DRIVEN CONTINUOUSLY VARIABLE TRANSMISSION

(71) Applicant: HONDA MOTOR CO., LTD., Tokyo (JP)

(72) Inventor: Yuichiro Takemori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 15/222,957

(22) Filed: Jul. 29, 2016

(65) Prior Publication Data

US 2017/0030463 A1    Feb. 2, 2017

(30) Foreign Application Priority Data

Jul. 29, 2015 (JP) ................. 2015-149553

(51) Int. Cl.
| | |
|---|---|
| F16H 61/662 | (2006.01) |
| F16H 59/48 | (2006.01) |
| F16H 59/54 | (2006.01) |
| F16H 59/66 | (2006.01) |
| B60W 10/107 | (2012.01) |

(52) U.S. Cl.
CPC ..... *F16H 61/66272* (2013.01); *B60W 10/107* (2013.01); *F16H 59/48* (2013.01); *F16H 59/54* (2013.01); *F16H 59/66* (2013.01); *F16H 2061/66277* (2013.01)

(58) Field of Classification Search
None
See application file for complete search history.

(56) References Cited

U.S. PATENT DOCUMENTS

| | | | |
|---|---|---|---|
| 2009/0043468 A1* | 2/2009 | Kondo | B60W 10/06 701/61 |
| 2012/0116637 A1* | 5/2012 | Totsuka | F16D 48/066 701/60 |
| 2013/0138310 A1* | 5/2013 | Kushiyama | F16H 61/66272 701/60 |

FOREIGN PATENT DOCUMENTS

JP    2013-127287    6/2013

* cited by examiner

*Primary Examiner* — Ramya P Burgess
*Assistant Examiner* — Timothy Hannon
(74) *Attorney, Agent, or Firm* — Mori & Ward, LLP

(57) ABSTRACT

A road surface friction coefficient calculator is to detect a coefficient of friction on a road surface. A braking force calculator is to detect the braking force of a vehicle. A decelerating calculator is to determine whether the vehicle transitions to a decelerating travel mode. The pulley pressure controller is to control pulley pressure in a belt-driven continuously variable transmission. The pulley pressure controller is to increase the pulley pressure by an additional amount when the decelerating calculator determines the vehicle transitions to the decelerating travel mode while the coefficient of friction detected by the road surface friction coefficient calculator is equal to or lower than a reference value. The pulley pressure controller is to reduce the additional amount when the braking force calculator detects an increase in the braking force in the decelerating travel mode.

6 Claims, 6 Drawing Sheets

PULLEY PRESSURE CONTROL APPARATUS FOR BELT-DRIVEN CONTINUOUSLY VARIABLE TRANSMISSION

CROSS-REFERENCE TO RELATED APPLICATIONS

The present application claims priority under 35 U.S.C. § 119 to Japanese Patent Application No. 2015-149553, filed Jul. 29, 2015, entitled "Pulley Pressure Control Apparatus for Belt-Driven Continuously Variable Transmission." The contents of this application are incorporated herein by reference in their entirety.

BACKGROUND

1. Field

The present disclosure relates to a pulley pressure control apparatus for a belt-driven continuously variable transmission.

2. Description of the Related Art

Pulley pressure for a drive pulley and a driven pulley of a belt-driven continuously variable transmission is controlled for the following purposes: increasing or decreasing pulley-groove widths to change the transmission gear ratio and preventing slippage of an endless belt on the pulleys. Slippage of the endless belt is caused by an increase in torque transmitted between the endless belt and the pulleys. Thus, to prevent the slippage of the endless belt, pulley pressure is increased when the torque transmitted by the endless belt is large and decreased when the torque transmitted by the endless belt is small.

When driving wheels are braked on a road surface with a low coefficient of friction (hereinafter also referred to as a low μ road surface), the endless belt slips on the pulleys, easily causing lock-up of the driving wheels. Thus, the slippage of the endless belt needs to be prevented by making the pulley pressure larger on a low μ road surface than on a high μ road surface (hereinafter also referred to as a high μ road surface). However, excessive increase in the pulley pressure unnecessarily increases load on a hydraulic pressure generator such as an oil pump, and in turn, increases the fuel consumption of an engine that drives the hydraulic pressure generator.

Regarding this problem, Japanese Unexamined Patent Application Publication No. 2013-127287 aims to achieve both prevention of slippage of the endless belt and reduction in the load on the hydraulic pressure generator, by calculating pulley pressure necessary for preventing slippage of the endless belt on a high μ road surface and pulley pressure necessary for preventing slippage of the endless belt on a low μ road surface and employing the larger one of these pulley pressures in absolute value.

SUMMARY

According to one aspect of the present invention, a pulley pressure control apparatus for a belt-driven continuously variable transmission that includes a drive pulley connected to a power source, a driven pulley connected to a driving wheel, and an endless belt looped over the drive pulley and the driven pulley and that transmits drive power of the power source to the driving wheel after changing the speed of the drive power includes a pulley pressure controller that controls pulley pressure in the belt-driven continuously variable transmission, a road surface friction coefficient calculator that detects a coefficient of friction on a road surface, and a braking force calculator that detects a braking force of a vehicle. When the vehicle transitions to a decelerating travel mode with the road surface friction coefficient calculator detecting that the coefficient of friction on the road surface is a predetermined value or lower, the pulley pressure controller increases the pulley pressure by a predetermined additional amount. When the braking force calculator detects an increase in the braking force in the decelerating travel mode, the pulley pressure controller reduces the additional amount for the pulley pressure.

According to another aspect of the present invention, a pulley pressure control apparatus for a belt-driven continuously variable transmission includes a road surface friction coefficient calculator, a braking force calculator, a decelerating calculator, and a pulley pressure controller. The road surface friction coefficient calculator is to detect a coefficient of friction on a road surface. The braking force calculator is to detect the braking force of a vehicle. The decelerating calculator is to determine whether the vehicle transitions to a decelerating travel mode. The pulley pressure controller is to control pulley pressure in the belt-driven continuously variable transmission. The belt-driven continuously variable transmission includes a drive pulley connected to a power source, a driven pulley connected to a driving wheel, and an endless belt looped over the drive pulley and the driven pulley. The belt-driven continuously variable transmission is configured to transmit drive power of the power source to the driving wheel while changing a gear ratio. The pulley pressure controller is to increase the pulley pressure by an additional amount when the decelerating calculator determines the vehicle transitions to the decelerating travel mode while the coefficient of friction detected by the road surface friction coefficient calculator is equal to or lower than a reference value. The pulley pressure controller is to reduce the additional amount when the braking force calculator detects an increase in the braking force in the decelerating travel mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
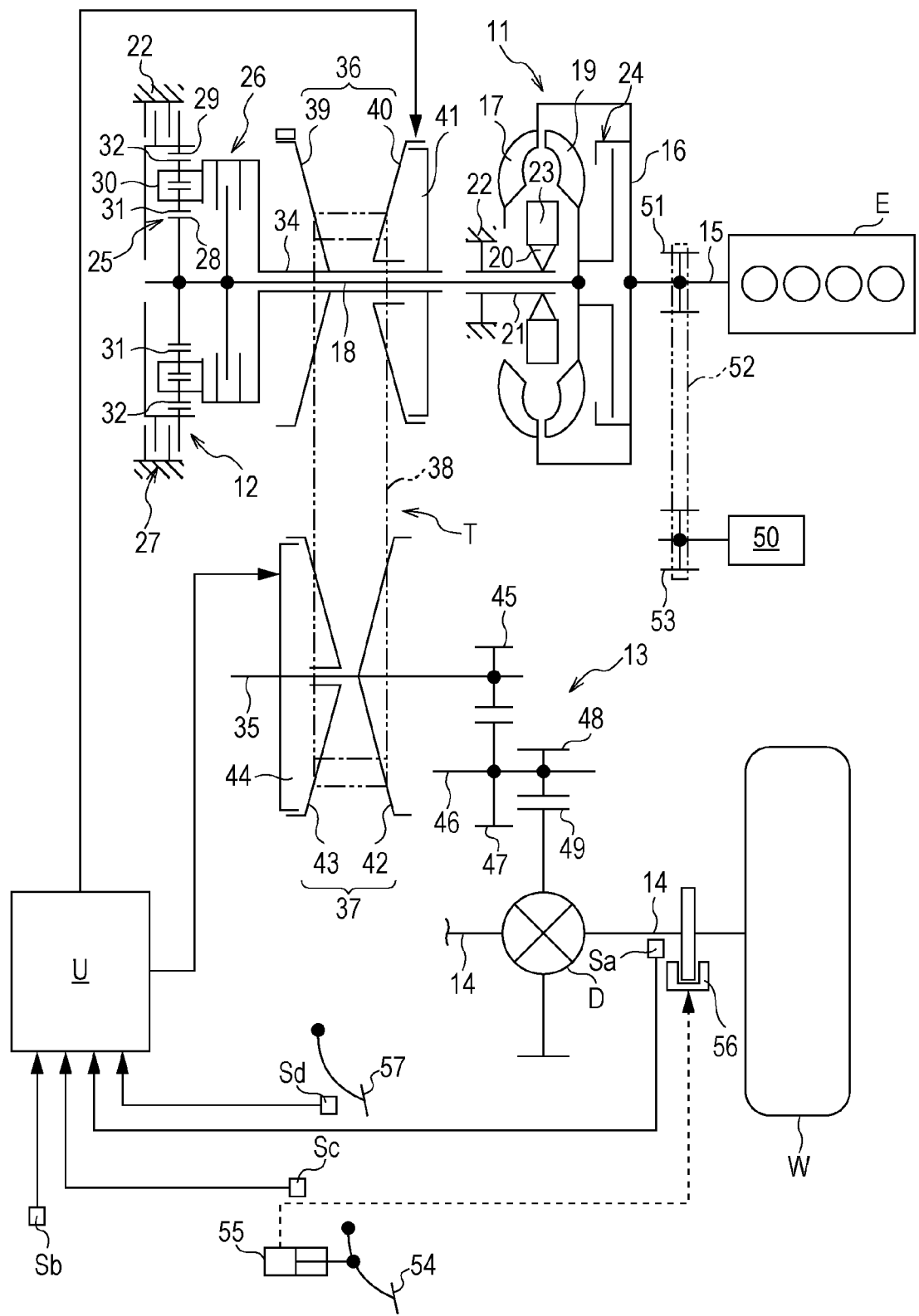
FIG. 1 is a block diagram of a belt-driven continuously variable transmission and a pulley pressure control system.

The embodiments will now be described with reference to the accompanying drawings, wherein like reference numerals designate corresponding or identical elements throughout the various drawings.

First, the structure of a belt-driven continuously variable transmission T is described with reference to FIG. 1. Drive power of an engine E is transmitted to left and right driving wheels W, W through a torque converter 11, a forward/reverse switching mechanism 12, the belt-driven continuously variable transmission T, a decelerator 13, a differential gear D, and left and right foot shafts 14, 14.

The torque converter 11 includes a pump impeller 17 fixed to a front cover 16 which is connected to a crankshaft 15 of the engine E, a turbine runner 19 fixed to an output shaft 18, a stator 23 located between the pump impeller 17 and the turbine runner 19 and connected to a casing 22 via a one-way clutch 20 and a stator shaft 21, and a lock-up clutch 24 capable of directly connecting the front cover 16 and the turbine runner 19. When the lock-up clutch 24 is disengaged, drive power of crankshaft 15 is transmitted to the output shaft 18 after being amplified in torque by a working fluid circulating through the pump impeller 17, the turbine runner 19, and the stator 23. When the lock-up clutch 24 is engaged, the drive power from the crankshaft 15 is directly transmitted to the output shaft 18.

The forward/reverse switching mechanism 12 includes a double-pinion planetary gear mechanism 25, a forward clutch 26, and a reverse brake 27. The planetary gear mechanism 25 includes a sun gear 28, a ring gear 29, a carrier 30, and inner pinions 31 and outer pinions 32, each set of the inner and outer pinions 31 and 32 being rotatably supported by the carrier 30, meshing with each other, and meshing with the sun gear 28 and the ring gear 29, respectively. A main shaft 34 of the belt-driven continuously variable transmission T is coaxially fitted around the outer circumference of the output shaft 18. The main shaft 34 can be coupled to the output shaft 18 via the forward clutch 26. The carrier 30 of the planetary gear mechanism 25 is connected to the main shaft 34, and the ring gear 29 can be coupled to the casing 22 via the reverse brake 27.

When the forward clutch 26 of the forward/reverse switching mechanism 12 is engaged, rotation of the output shaft 18 of the torque converter 11 is directly transmitted to the main shaft 34 of the belt-driven continuously variable transmission T, establishing the forward gear position. When the reverse brake 27 of the forward/reverse switching mechanism 12 is engaged to couple the carrier 30 to the casing 22, the rotation of the output shaft 18 of the torque converter 11 is reduced in speed and reversed in direction and then transmitted to the main shaft 34 of the belt-driven continuously variable transmission T, establishing the reverse gear position.

The belt-driven continuously variable transmission T includes a drive pulley 36 provided on the main shaft 34, a driven pulley 37 provided on a counter shaft 35, and an endless belt 38 looped over the drive pulley 36 and the driven pulley 37. The drive pulley 36 has a stationary pulley half 39 and a movable pulley half 40, and the groove width of the drive pulley 36 can be controlled by control of hydraulic pressure supplied to a pulley oil chamber 41. The driven pulley 37 has a stationary pulley half 42 and a movable pulley half 43, and the groove width of the drive pulley 36 can be controlled by control of hydraulic pressure supplied to a pulley oil chamber 44. Changing the hydraulic pressures supplied to the pulley oil chambers 41 and 44 allows continuous control of the transmission gear ratio, as well as prevention of the endless belt 38 from slipping on the drive pulley 36 and the driven pulley 37.

The decelerator 13 includes a first speed reducing gear 45 fixed to the counter shaft 35 of the belt-driven continuously variable transmission T, a second speed reducing gear 47 fixed to a speed reducing shaft 46 and meshing with the first speed reducing gear 45, and a final drive gear 48 fixed to the speed reducing shaft 46. The final drive gear 48 meshes with a final driven gear 49 fixed to the case of the differential gear D.

The crankshaft 15 of the engine E is connected to an oil pump 50 via a drive sprocket 51, an endless chain 52, and a driven sprocket 53. Oil discharged from the oil pump 50 is supplied as a working fluid to parts such as the torque converter 11, the forward clutch 26, the reverse brake 27, and the pulley oil chambers 41 and 44. The oil from the oil pump 50 is also supplied as a lubricant to parts that need lubrication.

A master cylinder 55 is actuated by operation on a brake pedal 54 and generates brake hydraulic pressure. The master cylinder 55 is connected to brake calipers 56, 56 that brake the respective left and right driving wheels W, W as well as to brake calipers (not shown) that brake respective left and right driven wheels (not shown).

Driving-wheel revolution sensor Sa, Sa detect the numbers of revolutions of the driving wheels W, W, and driven-wheel revolution sensors Sb, Sb detect the numbers of revolutions of the driven wheels (not shown). A brake hydraulic pressure sensor Sc detects the brake hydraulic pressure generated by the master cylinder 55 and supplied to the brake calipers 56, 56 of the driving wheels W, W. An accelerator pedal position sensor Sd detects the position of an accelerator pedal 57 operated by a driver.

The belt-driven continuously variable transmission T continuously changes the transmission gear ratio to the Overdrive ratio by increasing the hydraulic pressure supplied to the pulley oil chamber 41 of the drive pulley 36 to move the movable pulley half 40 toward the stationary pulley half 39, and by decreasing the hydraulic pressure supplied to the pulley oil chamber 44 of the driven pulley 37 to move the movable pulley half 43 away from the stationary pulley half 42. Conversely, the belt-driven continuously variable transmission T continuously changes the transmission gear ratio to the Low ratio by decreasing the hydraulic pressure supplied to the pulley oil chamber 41 of the drive pulley 36 to move the movable pulley half 40 away from the stationary pulley half 39, and by increasing the hydraulic pressure supplied to the pulley oil chamber 44 of the driven pulley 37 to move the movable pulley half 43 away from the stationary pulley half 42.

In addition to this transmission gear ratio control for changing the transmission gear ratio by changing the groove widths of the drive pulley 36 and the driven pulley 37, slippage prevention control is achieved by control of the pulley pressure in the belt-driven continuously variable transmission T. The slippage prevention control is performed to prevent the endless belt 38 from slipping on the drive pulley 36 and the driven pulley 37. The final hydraulic pressures supplied to the pulley oil chambers 41, 44 of the drive pulley 36 and the driven pulley 37 are values obtained by adding the hydraulic pressure obtained for the transmission gear ratio control and the hydraulic pressure obtained for the slippage prevention control.

Increasing pulley pressure for the slippage prevention control increases the friction force between the endless belt 38 and the drive and driven pulleys 36, 37 and thereby prevents slippage of the endless belt 38. Such increase in the pulley pressure, however, leads to an increase in load on the oil pump 50, which may increase the fuel consumption by the engine E driving the oil pump 50. Thus, the pulley pressure needs to be the least amount necessary to prevent the endless belt 38 from slipping.

Figure 2:
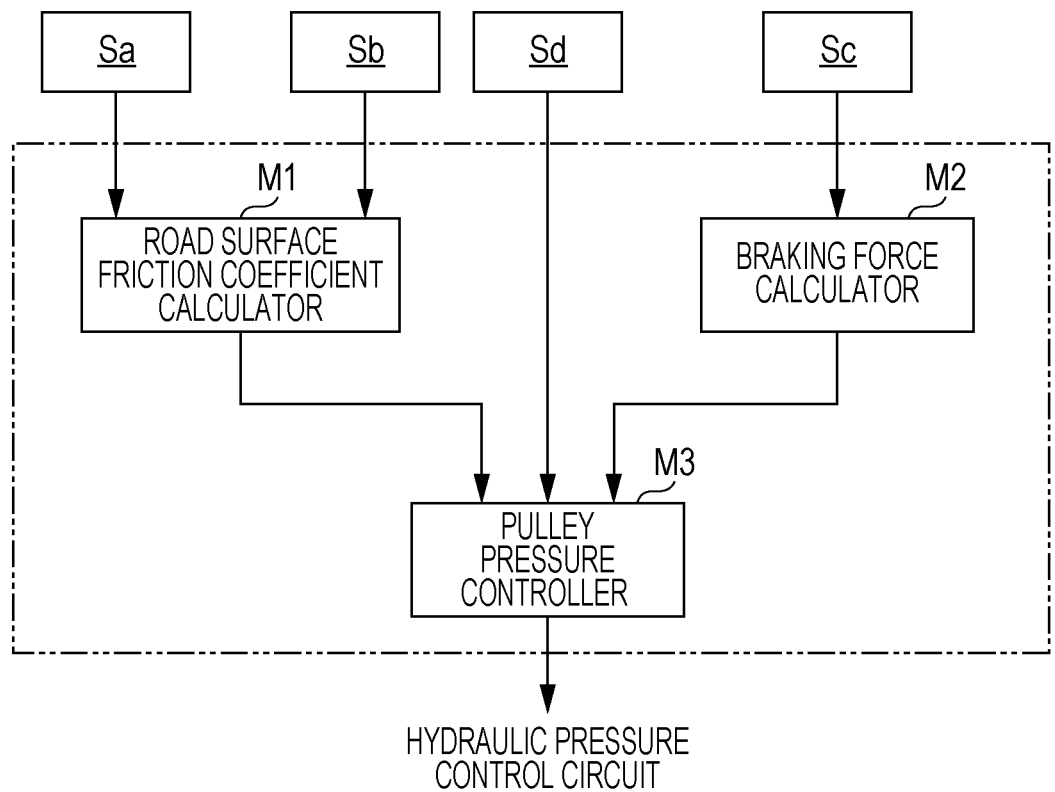
FIG. 2 is a block diagram illustrating a circuit configuration of an electronic control unit.

FIG. 2 is a block diagram of a system for controlling the pulley pressure for the drive pulley 36 and the driven pulley 37 for the slippage prevention control. An electronic control unit U that controls the pulley pressure for slippage prevention includes a road surface friction coefficient calculator M1, a braking force calculator M2, and a pulley pressure controller M3. The road surface friction coefficient calculator M1 is connected to the driving-wheel revolution sensors Sa, Sa and the driven-wheel revolution sensors Sb, Sb. The braking force calculator M2 is connected to the brake hydraulic pressure sensor Sc, and the pulley pressure controller M3 is connected to the accelerator pedal position sensor Sd.

The road surface friction coefficient calculator M1 receives the numbers of revolutions of the drive wheels detected by the driving-wheel revolution sensors Sa, Sa and the numbers of revolutions of the driven wheels detected by the driven-wheel revolution sensors Sb, Sb, and calculates a coefficient of friction on a road surface on which the vehicle is travelling. The coefficient of road-surface friction is detected using a known method, or specifically, through comparison between the numbers of revolutions of the drive wheels and the numbers of revolutions of the driven wheels. When the vehicle is accelerating, the numbers of revolutions of the driven wheels depend not on the coefficient of road-surface friction but on the vehicle speed. On a low μ road surface such as an icy road or a graveled road, the driving wheels W, W slip as the coefficient of road-surface friction increases, and the numbers of revolutions of the drive wheels become larger than those of the driven wheels. Thus, the road surface friction coefficient calculator M1 can detect the coefficient of road-surface friction by observing the deviation of the numbers of revolutions of the drive wheels from those of the driven wheels.

On a low μ road surface, the driving wheels W, W repeat slipping and recovering from the slippage at short intervals, causing fine fluctuations in the vehicle speed (the number of revolutions of the driven wheels) accordingly. Thus, the road surface friction coefficient calculator M1 can alternatively detect the coefficient of road-surface friction by observing the fluctuations in the numbers of revolutions of the driven wheels.

The pulley pressure controller M3 calculates a basic pulley pressure necessary for the slippage prevention of the endless belt 38. Slippage of the endless belt 38 is caused by an increase in torque transmitted between the endless belt 38 and the drive and driven pulleys 36, 37, i.e., torque inputted to the belt-driven continuously variable transmission T. The input torque changes basically by following the position of the accelerator pedal 57. Thus, pulley pressure controller M3 can calculate the basic pulley pressure based on the position of the accelerator pedal 57 detected by the accelerator pedal position sensor Sd.

When the driver releases the accelerator pedal 57 while the road surface friction coefficient calculator M1 is detecting a low μ road surface, the vehicle slows down with engine brake, transitioning to a decelerating travel mode. When the driver then depresses the brake pedal 54 to brake the driving wheels W, W, the vehicle slows down more. In such a decelerating travel mode on a low μ road surface, the belt-driven continuously variable transmission T receives drive torque transmitted from the engine E and inertia torque transmitted back from the driving wheels W, W. As a result, the endless belt 38 is likely to slip on the drive pulley 36 and the driven pulley 37 to cause lock-up of the driving wheels W, W.

Figure 3A:
FIG. 3A illustrates characteristics for a case where a brake pedal is initially depressed.
Figure 3B:
FIG. 3B illustrates characteristics for a case where the brake pedal is additionally depressed.

To overcome this problem, when the vehicle transitions to the decelerating travel mode on a low μ road surface, the pulley pressure controller M3 instructs a hydraulic pressure control circuit to output pulley pressure which is obtained by adding a predetermined additional pulley pressure amount to the basic pulley pressure, so as to prevent slippage of the endless belt 38 with this increased pulley pressure. If the driving wheels W, W of a vehicle travelling on a low μ road surface were to lock up upon release of the accelerator pedal 57 and depression of the brake pedal 54, the lockup would usually happen when the driver initially depresses the brake pedal 54. If the driving wheels W, W do not lock up when the driver initially depresses the brake pedal 54, the driving wheels W, W rarely lock up when the driver subsequently performs additional depression of the brake pedal 54 to increase the braking force (see FIGS. 3A and 3B).

Figure 4B:
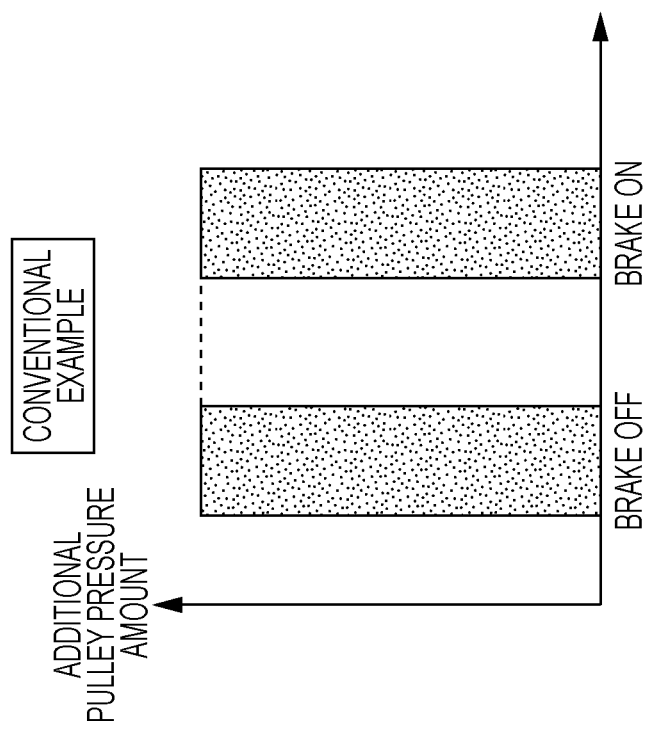
FIGS. 4A and 4B illustrate an additional pulley pressure amount.
Figure 4A:
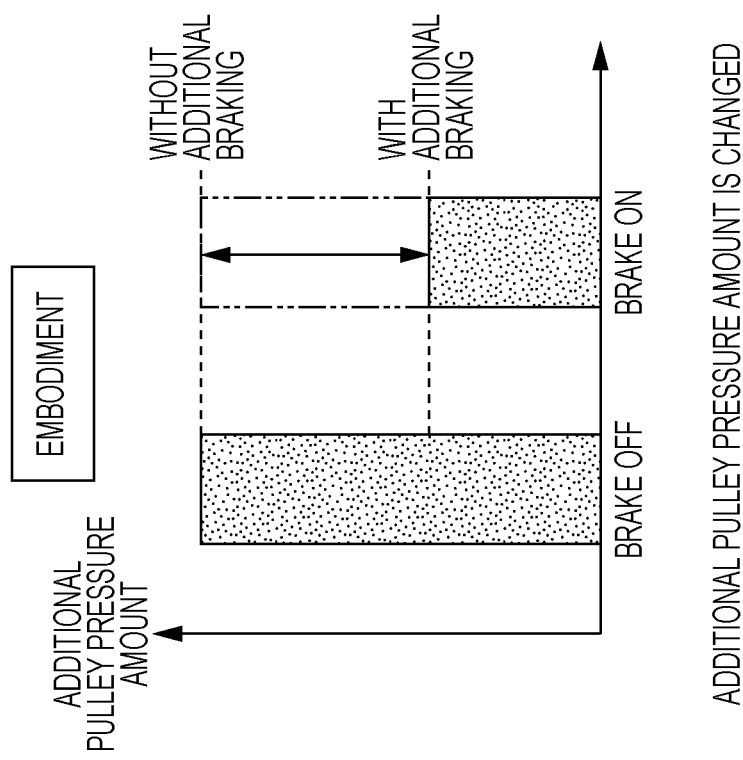

Thus, in the present embodiment, when the braking force calculator M2 detects additional depression of the brake pedal 54, the pulley pressure controller M3 reduces the additional pulley pressure amount to be added to the basic pulley pressure. Thereby, when the vehicle transitions to the decelerating travel mode on a low μ road surface, the least additional pulley pressure amount necessary to prevent slippage of the endless belt 38 is added, so as to minimize load on the oil pump 50 (see FIGS. 4A and 4B).

Figure 5:
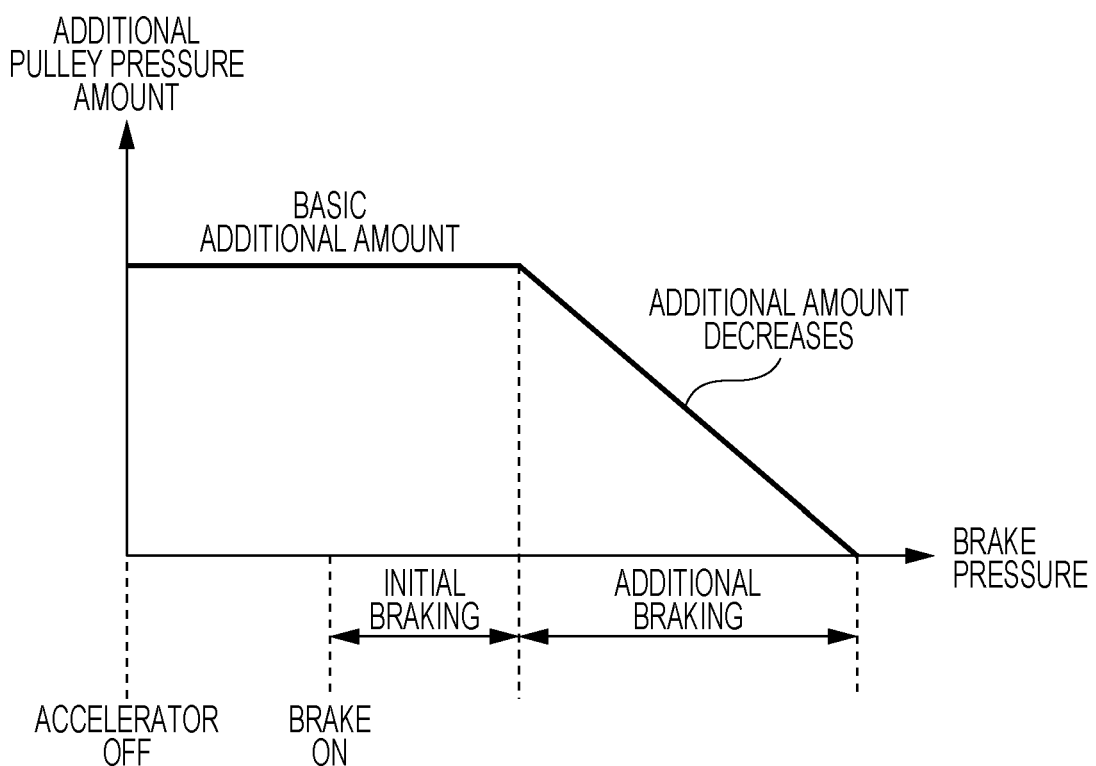
FIG. 5 illustrates the additional pulley pressure amount employed upon the initial depression and the additional depression of the brake pedal.

FIG. 5 shows changes in the additional pulley pressure amount. When the vehicle transitions to the decelerating travel mode with engine brake upon release of the accelerator pedal 57 on a low μ road surface, a basic additional amount is calculated, as the additional pulley pressure amount, corresponding to the position of the accelerator pedal 57. When the driver subsequently depresses the brake pedal 54 (initial braking), the same basic additional amount is maintained. When the driver additionally depresses the brake pedal 54 subsequent to the initial braking, the basic additional amount is reduced linearly according to an increase in the amount of the additional depression.

Figure 6:
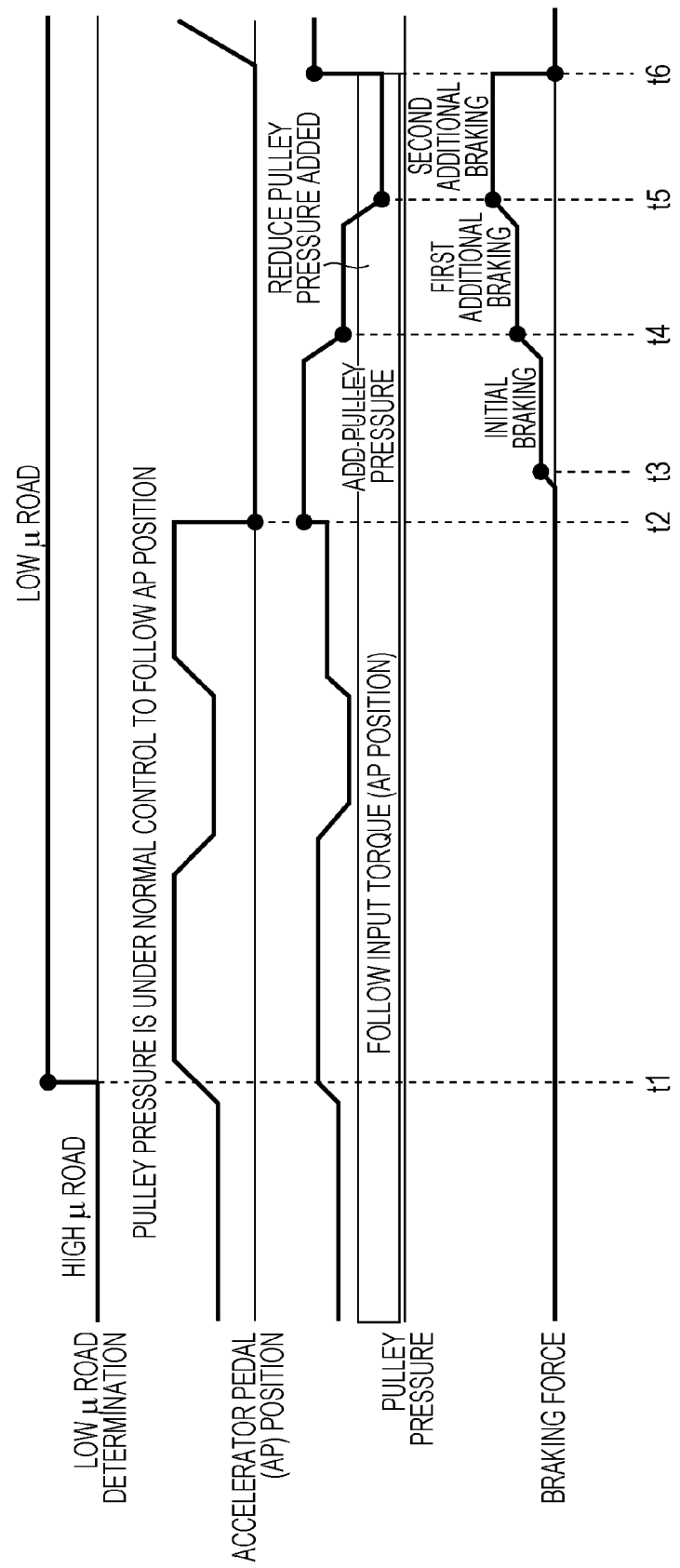
FIG. 6 is a time chart illustrating an example of operation.

FIG. 6 is a time chart showing an example of pulley pressure control. When the road surface friction coefficient calculator M1 determines at time 1 that the road surface has a low coefficient of friction, pulley pressure calculated by the pulley pressure controller M3 is controlled to follow the position of the accelerator pedal 57. When the vehicle transitions to the decelerating travel mode with engine brake upon release of the accelerator pedal 57 at time t2, the pulley pressure controller M3 adds the predetermined additional pulley pressure amount to the basic pulley pressure. Even after the driver who has released the accelerator pedal 57 depresses the brake pedal 54 to start initial braking at time t3, the same predetermined additional pulley pressure amount is added to the basic pulley pressure.

When the driver additionally depresses the brake pedal 54 (first additional braking) at time t4, the pulley pressure controller M3 reduces the additional pulley pressure amount according to the amount of the additional depression. When the driver yet additionally depresses the brake pedal 54 (second additional braking) at time t5, the pulley pressure controller M3 further reduces the additional pulley pressure amount according to the amount of the additional depression. When the driver releases the brake pedal 54 and depresses the accelerator pedal 57 at time t6, the pulley pressure controller M3 ends the pulley pressure addition control and returns to calculating the basic pulley pressure corresponding to the position of the accelerator pedal 57.

According to the embodiment described above, when the vehicle transitions to the decelerating travel mode with the road surface friction coefficient calculator M1 determining that the road surface has a low coefficient of friction, the pulley pressure controller M3 increases pulley pressure by the predetermined additional amount. Thereby, even on a low μ road surface where the driving wheels W, W easily lock up, slippage of the endless belt 38 of the belt-driven continuously variable transmission T can be prevented to prevent the lock-up of the driving wheels W, W, enabling avoidance of damage on the drive pulley 36, driven pulley 37, and the endless belt 38.

When the braking force calculator M2 detects, in the decelerating travel mode, additional depression of the brake pedal 54 which is unlikely to cause the lock-up, the pulley pressure controller M3 reduces the additional pulley pressure amount. Thereby, the pulley pressure is increased to the minimum necessary to prevent the lock-up of the driving wheels W, W due to slippage of endless belt 38. This allows less load to be put on the oil pump 50 that generates the pulley pressure, and in turn, allows saving of the fuel consumption of the engine E that drives the oil pump 50.

The more the braking force increases in the additional depression of the brake pedal 54, the less likely the lock-up happens. Thus, the larger the increased amount of the braking force detected by the braking force calculator M2, the more the pulley pressure controller M3 reduces the additional pulley pressure amount. Such a minimum increase in the pulley pressure enables further reduction in the load on the oil pump 50.

When the braking force detected by the braking force calculator M2 becomes zero, the pulley pressure controller M3 reduces the additional pulley pressure amount to zero, finishing the addition to the pulley pressure as soon as there is no possibility for the lock-up. This allows not only further reduction in the load on the oil pump 50, but also prevention of slippage of the endless belt 38 to prevent lock-up of the driving wheels W, W by increasing the pulley pressure by the predetermined additional amount when the vehicle next transitions from an accelerating travel mode to the decelerating travel mode.

The embodiment of the present disclosure has been described above. However, the present disclosure can be variously modified in designs without departing from the gist of the present disclosure.

For example, the level of the braking force of the driving wheels W, W, which is detected based on the output from the brake hydraulic pressure sensor Sc in the above embodiment, can be detected based on an output from a stroke sensor on the brake pedal 54.

In addition, the method for detecting the coefficient of friction on a road surface and the method for calculating the basic pulley pressure for pulley slippage control are not limited to the ones used in the embodiment.

A first aspect of an embodiment provides a pulley pressure control apparatus for a belt-driven continuously variable transmission that includes a drive pulley connected to a power source, a driven pulley connected to a driving wheel, and an endless belt looped over the drive pulley and the driven pulley and that transmits drive power of the power source to the driving wheel after changing the speed of the drive power. The pulley pressure control apparatus includes a pulley pressure controller that controls pulley pressure in the belt-driven continuously variable transmission, a road surface friction coefficient calculator that detects a coefficient of friction on a road surface, and a braking force calculator that detects a braking force of a vehicle. When the vehicle transitions to a decelerating travel mode with the road surface friction coefficient calculator detecting that the coefficient of friction on the road surface is a predetermined value or lower, the pulley pressure controller increases the pulley pressure by a predetermined additional amount. When the braking force calculator detects an increase in the braking force in the decelerating travel mode, the pulley pressure controller reduces the additional amount for the pulley pressure.

According to the configuration of the first aspect of the embodiment, even when the vehicle is in the decelerating travel mode on a low μ road surface on which the driving wheel easily locks up, slippage between the endless belt and the pulleys can be prevented to prevent lock-up of the driving wheel.

Lock-up of the driving wheel tends to be caused by initial braking in the decelerating travel mode. If no lock-up occurs at the initial braking, lock-up is unlikely to happen upon a subsequent increase in the braking force (additional depression of a brake pedal). Thus, when the braking force calculator detects an increase in the braking force (additional depression of the brake pedal) in the decelerating travel mode, the pulley pressure controller reduces the additional amount for the pulley pressure. The pulley pressure is thus increased to the minimum necessary to prevent the driving wheel lock-up, allowing less load to be put on a hydraulic pressure generator generating the pulley pressure.

A second aspect of the embodiment provides the pulley pressure control apparatus for a belt-driven continuously variable transmission according to the first aspect, in which the pulley pressure controller reduces the additional amount for the pulley pressure more when an amount of the increase in the braking force detected by the braking force calculator is larger.

According to the configuration of the second aspect of the embodiment, the pulley pressure controller reduces the additional amount for the pulley pressure more when the amount of the increase in the braking force detected by the braking force calculator is larger, because the more the braking force increases in additional braking subsequent to initial braking, the less likely the lock-up happens. Such minimum increase in the pulley pressure allows further reduction in the load on the hydraulic pressure generator.

A third aspect of the embodiment provides the pulley pressure control apparatus for a belt-driven continuously variable transmission according to the first aspect, in which when the braking force detected by the braking force calculator becomes zero, the pulley pressure controller reduces the additional amount for the pulley pressure to zero.

According to the configuration of the third aspect of the embodiment, the addition to the pulley pressure is finished as soon as there is no possibility for lock-up. This allows not only further reduction in the load on the hydraulic pressure generator, but also prevention of slippage of the endless belt to prevent lock-up of the driving wheel by increasing the pulley pressure by the predetermined additional amount when the vehicle next transitions from the accelerating travel mode to the decelerating travel mode.

The engine E in the embodiment corresponds to the power source of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A pulley pressure control apparatus for a belt-driven continuously variable transmission that includes a drive pulley connected to a power source, a driven pulley connected to a driving wheel, and an endless belt looped over the drive pulley and the driven pulley, and that transmits drive power of the power source to the driving wheel while changing a gear ratio, the pulley pressure control apparatus comprising:
   a pulley pressure controller that controls pulley pressure in the belt-driven continuously variable transmission;
   a road surface friction coefficient calculator that detects a coefficient of friction on a road surface; and
   a braking force calculator that detects a braking force of a vehicle, wherein
   when the vehicle transitions to a decelerating travel mode with the road surface friction coefficient calculator detecting that the coefficient of friction on the road surface is a predetermined value or lower, the pulley pressure controller increases the pulley pressure by a predetermined additional amount, and
   when the braking force calculator detects an increase in the braking force in the decelerating travel mode, the pulley pressure controller reduces the additional amount for the pulley pressure.

2. The pulley pressure control apparatus for the belt-driven continuously variable transmission according to claim 1, wherein
   the pulley pressure controller reduces the additional amount for the pulley pressure more when an amount of the increase in the braking force detected by the braking force calculator is larger.

3. The pulley pressure control apparatus for the belt-driven continuously variable transmission according to claim 1, wherein
   when the braking force detected by the braking force calculator becomes zero, the pulley pressure controller reduces the additional amount for the pulley pressure to zero.

4. A pulley pressure control apparatus for a belt-driven continuously variable transmission, the pulley pressure control apparatus comprising:
   a road surface friction coefficient calculator to detect a coefficient of friction on a road surface;
   a braking force calculator to detect the braking force of a vehicle;
   a decelerating calculator to determine whether the vehicle transitions to a decelerating travel mode;
   a pulley pressure controller to control pulley pressure in the belt-driven continuously variable transmission that includes a drive pulley connected to a power source, a driven pulley connected to a driving wheel, and an endless belt looped over the drive pulley and the driven pulley, and that is configured to transmit drive power of the power source to the driving wheel while changing a gear ratio; and
   the pulley pressure controller to increase the pulley pressure by an additional amount when the decelerating calculator determines the vehicle transitions to the decelerating travel mode while the coefficient of friction detected by the road surface friction coefficient calculator is equal to or lower than a reference value, the pulley pressure controller being to reduce the additional amount when the braking force calculator detects an increase in the braking force in the decelerating travel mode.

5. The pulley pressure control apparatus according to claim 4, wherein
   the more increase the braking force calculator detects, the more additional amount the pulley pressure controller reduces.

6. The pulley pressure control apparatus according to claim 4, wherein
   when the braking force detected by the braking force calculator becomes zero, the pulley pressure controller reduces the additional amount to zero.

* * * * *